United States Patent
Fujihara et al.

(10) Patent No.: US 9,452,893 B1
(45) Date of Patent: Sep. 27, 2016

(54) ARTICLE SORTING APPARATUS

(71) Applicant: Kabushiki Kaisha Toshiba, Minato-ku (JP)

(72) Inventors: Hiroaki Fujihara, Kawasaki (JP); Yusuke Mitsuya, Yokohama (JP); Kazuya Saimei, Yokohama (JP); Hidenari Mori, Kawasaki (JP); Osamu Maruyama, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/820,007

(22) Filed: Aug. 6, 2015

(30) Foreign Application Priority Data

May 11, 2015 (JP) .................................. 2015-096664

(51) Int. Cl.
| | |
|---|---|
| *B65G 43/08* | (2006.01) |
| *B65G 47/46* | (2006.01) |
| *B65G 17/34* | (2006.01) |

(52) U.S. Cl.
CPC ............. *B65G 43/08* (2013.01); *B65G 17/345* (2013.01); *B65G 47/46* (2013.01); *B65G 2203/0233* (2013.01); *B65G 2811/0673* (2013.01)

(58) Field of Classification Search
CPC .... B65G 17/345; B65G 43/08; B65G 47/46; B65G 2203/0233; B65G 2811/0673
USPC .................................................... 198/370.06
See application file for complete search history.

(56) References Cited

U.S. PATENT DOCUMENTS

| | | | | |
|---|---|---|---|---|
| 6,732,849 | B2 * | 5/2004 | Yamamoto | B65G 17/16 198/370.03 |
| 7,080,725 | B2 * | 7/2006 | Hishinuma | B65G 17/345 198/370.06 |
| 8,100,058 | B2 * | 1/2012 | Austin | B65G 17/345 104/48 |
| 2015/0239015 | A1 | 8/2015 | Asari et al. | |

FOREIGN PATENT DOCUMENTS

| | | |
|---|---|---|
| JP | 6-255742 | 9/1994 |
| JP | 2004-231417 A | 8/2004 |
| JP | 4355513 | 11/2009 |

OTHER PUBLICATIONS

U.S. Appl. No. 14/833,636, filed Aug. 24, 2015, Fujihara et al.
U.S. Appl. No. 14/616,892, filed Feb. 9, 2015, Asari et al.

* cited by examiner

*Primary Examiner* — Leslie A Nicholson, III
*Assistant Examiner* — Keith R Campbell
(74) *Attorney, Agent, or Firm* — Oblon, McClelland, Maier & Neustadt, L.L.P.

(57) ABSTRACT

According to one embodiment, an article sorting apparatus includes a conveyance path extending in a first conveyance direction, the conveyance path having a curve; a conveyance unit that moves along the conveyance path and conveys an article loaded on the conveyance unit in a second conveyance direction that intersects the first conveyance direction of the conveyance path; a loading portion that loads the article onto the conveyance unit; a sorting portion that sorts the article conveyed by the conveyance unit; and a controller that controls movement of the conveyance unit in the first conveyance direction and conveyance of the article in the second conveyance direction and controls the conveyance unit before entry of the conveyance unit into the curve such that if the curve has a curvature radius that is less than a predetermined threshold value, the position of the article on a load surface of the conveyance unit on which the article is placed is adjusted to a position that is offset from a middle position on the load surface to an inward side with respect to a radial direction of the curve.

12 Claims, 10 Drawing Sheets

ARTICLE SORTING APPARATUS

CROSS-REFERENCE TO RELATED APPLICATION

This application is based upon and claims the benefit of priority from Japanese Patent Application No. 2015-096664, filed on May 11, 2015; the entire contents of which are incorporated herein by reference.

FIELD

Embodiments described herein relate generally to an article sorting apparatus.

BACKGROUND

Conventionally, there are cross belt sorters that convey a plurality of cells on a conveyance path and that also transfer an article in a direction orthogonal to a conveyance direction using a belt mechanism that is provided in each of the plurality of cells. The cross belt sorters convey each cell on which an article is loaded on a belt of its belt mechanism and transfer the article to a chute corresponding to a sorting destination of the article by driving the belt when the cell is adjacent to that chute. However, with priority given to prevention of an article from sliding off the belt during conveyance of each cell, it is difficult to reduce the radius of a curve of the conveyance path and to increase the conveyance speed, and thus there is a possibility that a reduction in size of the apparatus and an increase in processing speed thereof cannot be realized.

DETAILED DESCRIPTION

Hereinafter, an article sorting apparatus according to an embodiment will be described with reference to the drawings.

Figure 1:
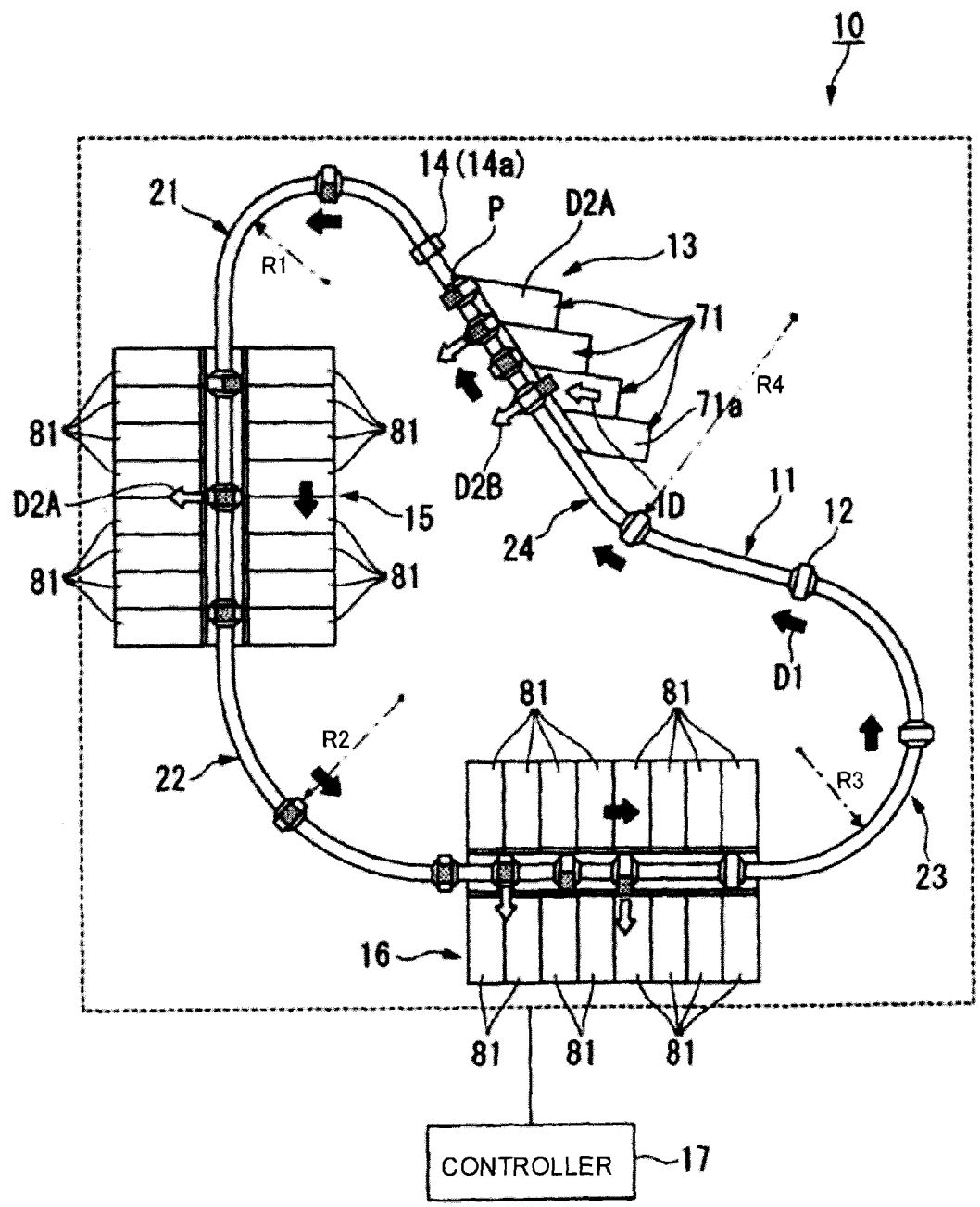
FIG. 1 is a plan view schematically showing the configuration of an article sorting apparatus according to an embodiment.

As shown in FIG. 1, an article sorting apparatus 10 according to the embodiment includes a conveyance path 11, and a plurality of conveyor cells 12, as well as a loading portion 13, an article position acquisition portion 14, a first sorting portion 15, and a second sorting portion 16, these portions being disposed along the conveyance path 11, and a controller 17.

The conveyance path 11 forms a circulation (cyclic) path that guides each of the plurality of conveyor cells 12. The conveyance path 11 guides each conveyor cell 12 to the loading portion 13, the article position acquisition portion 14, the first sorting portion 15, and the second sorting portion 16, sequentially, along the circulation (cyclic) path. The conveyance path 11 has a first curve 21, a second curve 22, a third curve 23, and a fourth curve 24, sequentially, along a first conveyance direction D1 (i.e., counterclockwise conveyance direction shown in FIG. 1). The first curve 21 is provided between the loading portion 13 and the first sorting portion 15. The second curve 22 is provided between the first sorting portion 15 and the second sorting portion 16. The third curve 23 and the fourth curve 24 are provided between the second sorting portion 16 and the loading portion 13.

Figure 2:
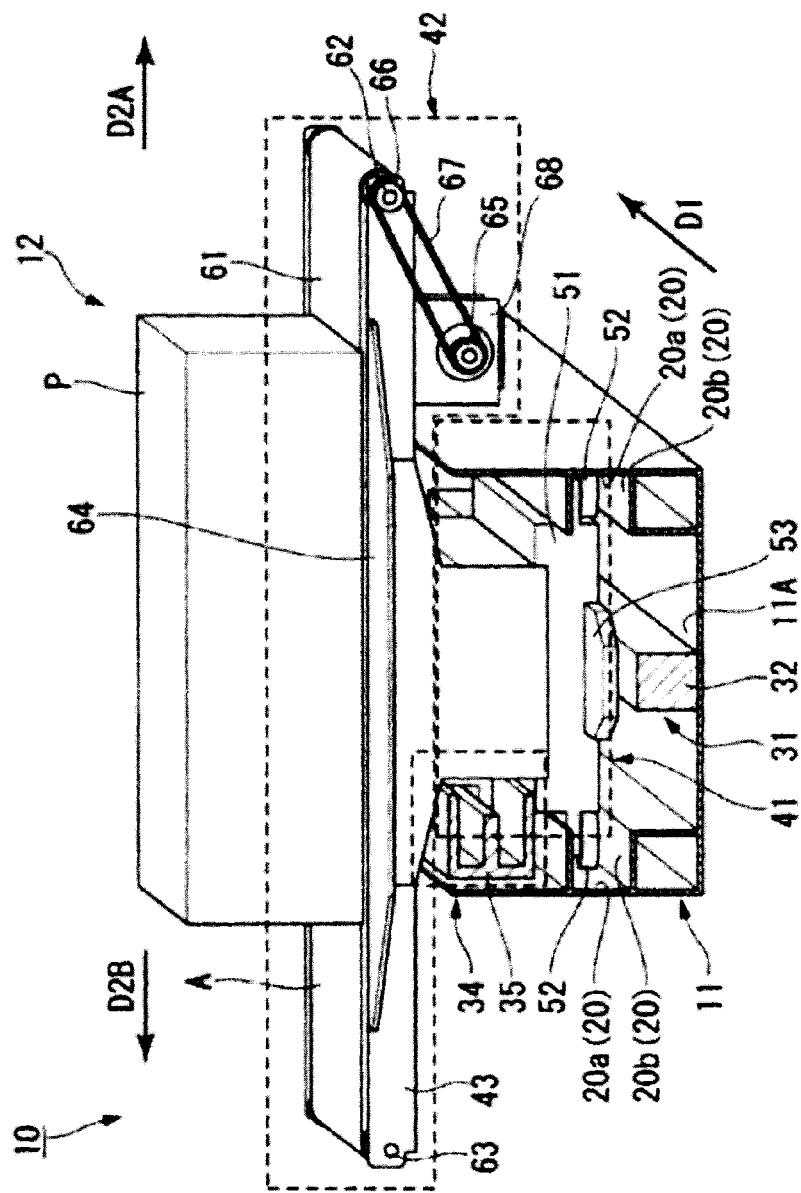
FIG. 2 is a perspective view schematically showing the configuration of a conveyor cell of the article sorting apparatus according to the embodiment.
Figure 3:
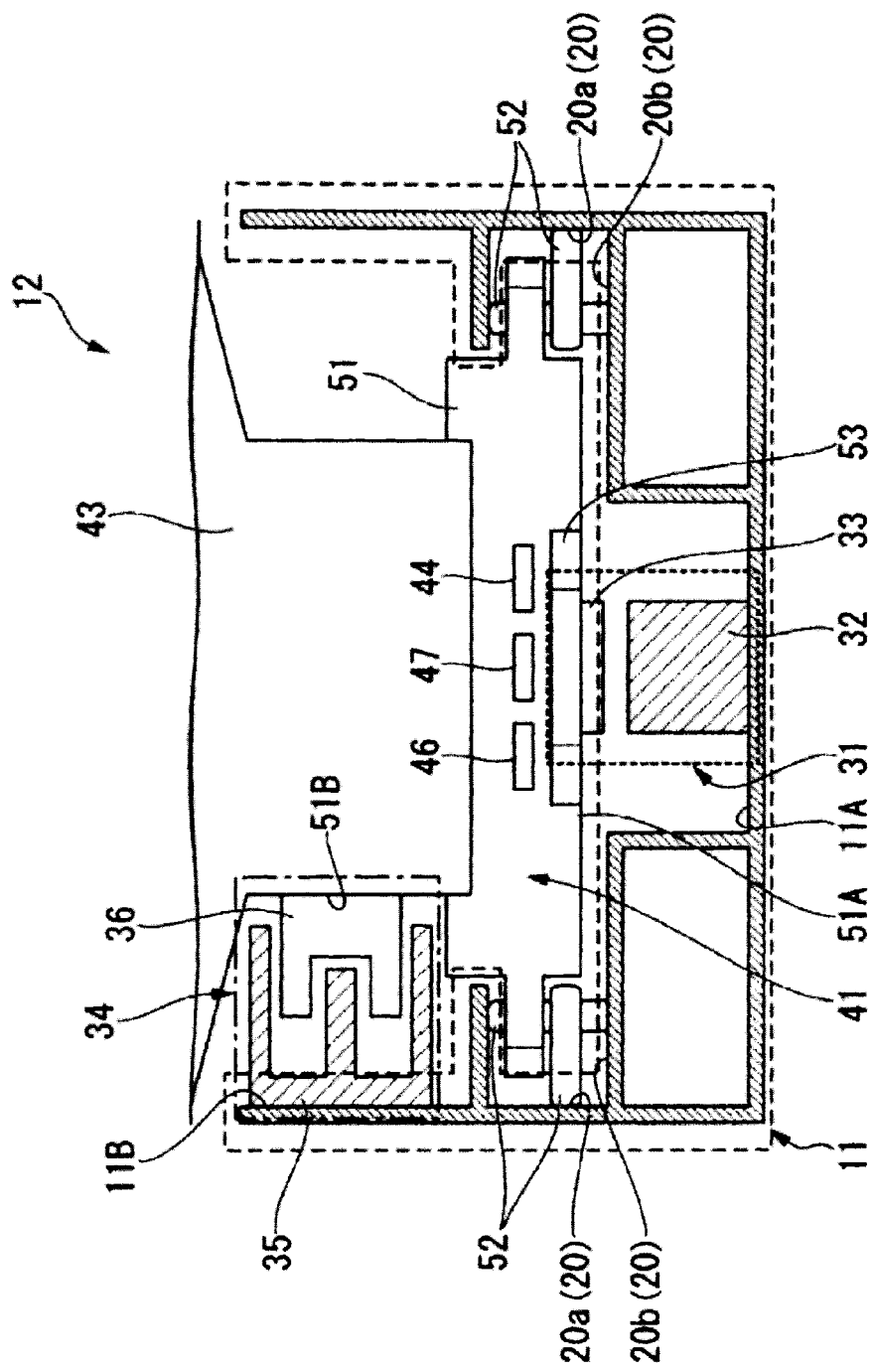
FIG. 3 is a cross-sectional view schematically showing the configuration of a portion of the conveyor cell of the article sorting apparatus according to the embodiment.

The first curve 21, the second curve 22, and the third curve 23 are each formed to have a left-hand curve shape that curves left as viewed in a direction of entry into the curve. The fourth curve 24 is formed to have a right-hand curve shape that curves right as viewed in the direction of entry into the curve. The first curve 21 is formed to have a curvature radius R1 that is less than a first threshold value. The second curve 22 is formed to have a curvature radius R2 that is not less than the first threshold value and not more than a second threshold value, the second threshold value being larger than the first threshold value. The third curve 23 is formed to have a curvature radius R3 that is less than the first threshold value. The fourth curve 24 is formed to have a curvature radius R4 that is larger than the second threshold value. As shown in FIGS. 2 and 3, the conveyance path 11 is provided with guide walls 20 (e.g., first guide wall 20a and second guide wall 20b) that come into contact with guide rollers 52 of each conveyor cell 12, which will be described later, and thus guide the course of the guide rollers 52.

The conveyance path 11 and the plurality of conveyor cells 12 are provided with a linear synchronous motor 31 that drives each conveyor cell 12 along the conveyance path 11. The linear synchronous motor 31 includes, for example, an electromagnetic coil 32 that is provided along the entire length of the conveyance path 11 and that serves as a stator, and a permanent magnet array 33 that is provided in each of the plurality of conveyor cells 12 and that serves as a mover. The linear synchronous motor 31 produces a driving force (conveying force) in the first conveyance direction D1 in the permanent magnet array 33 using the electric current flowing through the electromagnetic coil 32. The state of the electric current flowing through the electromagnetic coil 32 is controlled by the controller 17, and thus the linear synchronous motor 31 conveys each conveyor cell 12 at any desired speed and acceleration by means of the conveying force acting on the permanent magnet array 33.

The conveyance path 11 and the plurality of conveyor cells 12 are provided with a noncontact feeding portion 34 that feeds power from the conveyance path 11 to each conveyor cell 12. The noncontact feeding portion 34 includes, for example, a primary coil 35 that is provided over the entire length of the conveyance path 11 and a secondary coil 36 that is provided in each of the plurality of conveyor cells 12. The noncontact feeding portion 34 feeds power from the conveyance path 11 to each conveyor cell 12 by electromagnetic induction between the primary coil 35 and the secondary coil 36.

Figure 4:
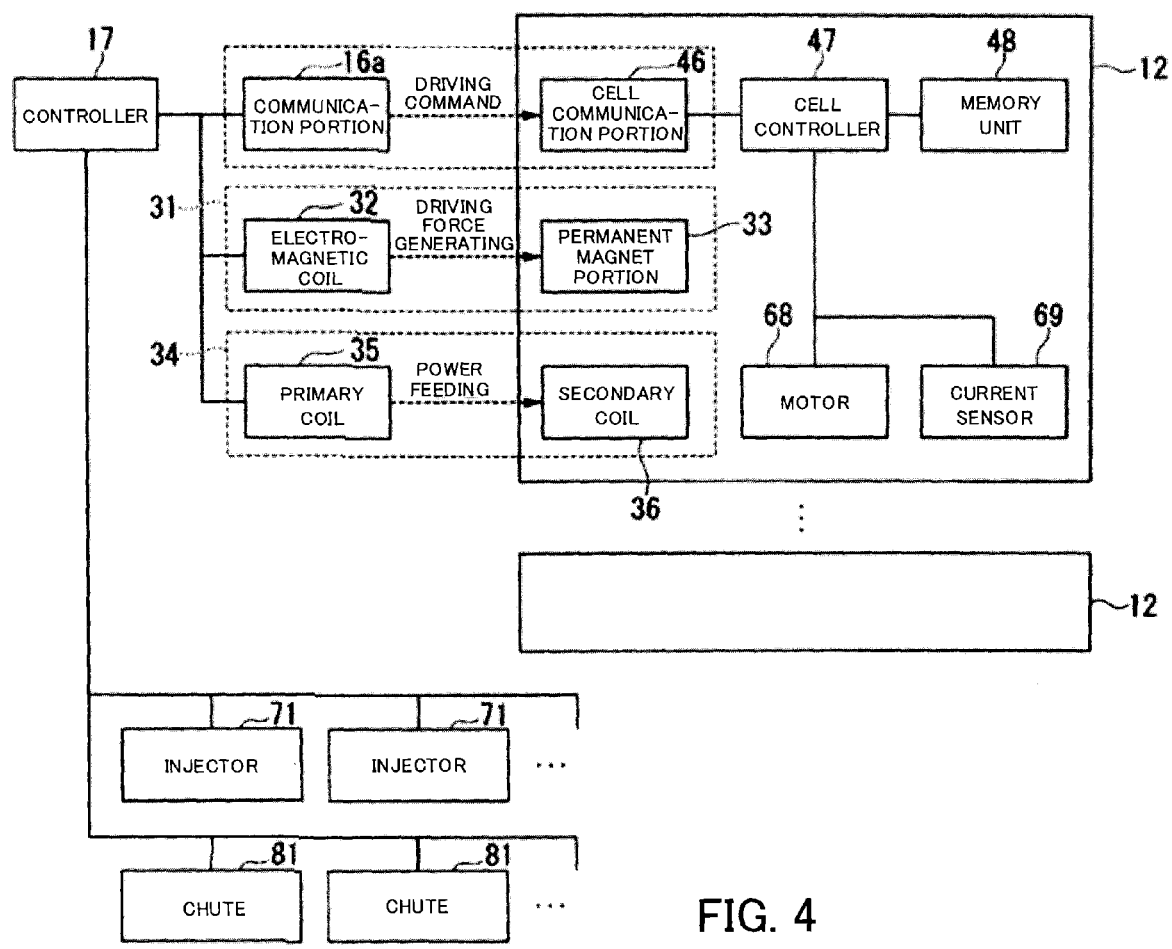
FIG. 4 is a block diagram showing a portion of the functional configuration of the article sorting apparatus according to the embodiment.

The plurality of conveyor cells 12 that are moved along the conveyance path 11 are arranged in a line in the first conveyance direction D1. The conveyor cells 12 that are adjacent to each other on the front side and the rear side in the first conveyance direction D1 are coupled to each other, for example. Coupling the conveyor cells 12 to each other enables the driving force to be transmitted to all the conveyor cells 12. Each of the plurality of conveyor cells 12 includes a chassis portion 41, a cross belt mechanism 42, a frame portion 43 to which the chassis portion 41 and the cross belt mechanism 42 are fixed, a battery 44, a cell communication portion 46, and a cell controller 47. As shown in FIG. 4, each of the plurality of conveyor cells 12 includes a memory unit 48.

As shown in FIGS. 2 and 3, the chassis portion 41 includes a chassis 51 serving as the base for the entire conveyor cell 12, two guide rollers 52 supported by the chassis 51, and connection mechanisms 53. With respect to the chassis 51, for example, the permanent magnet array 33 of the linear synchronous motor 31 is fixed to an under surface 51A of the chassis 51 that opposes a bottom face 11A of the conveyance path 11. Thus, the chassis 51 allows the permanent magnet array 33 to be disposed opposing the electromagnetic coil 32 that is provided on the bottom face 11A of the conveyance path 11. With respect to the chassis 51, for example, the secondary coil 36 of the noncontact feeding portion 34 is fixed to a side face 51B of the chassis 51 that opposes an inner wall surface 11B of the conveyance path 11. Thus, the chassis 51 allows the secondary coil 36 to be disposed opposing the primary coil 35 that is provided on the inner wall surface 11B of the conveyance path 11.

Each of the two guide rollers 52 has a rotation shaft (not shown) that is supported by the chassis 51. When the conveyor cell 12 is conveyed along the conveyance path 11, each guide roller 52 rotates about its rotation shaft while coming into contact with the guide wall 20 (i.e., first guide wall 20a and second guide wall 20b) of the conveyance path 11. Thus, the guide rollers 52 guide the conveyor cell 12 to the course that is guided by the guide walls 20 of the conveyance path 11.

The connection mechanisms 53 are respectively fixed to a front portion and a rear portion of the chassis 51. The connection mechanisms 53 of each conveyor cell 12 are coupled to the corresponding connection mechanisms 53 of other conveyor cells 12 that are adjacent to that conveyor cell 12 respectively on the front side and the rear side thereof in the first conveyance direction D1 so as to be rotatable about at least a vertical rotation shaft (not shown). Thus, the conveyor cells 12 that are adjacent to each other on the front side and the rear side in the first conveyance direction D1 are coupled to each other by their connection mechanisms 53 without obstructing each other's operation.

The cross belt mechanism 42 is fixed to the chassis portion 41 by the frame portion 43 made of metal, for example. The cross belt mechanism 42 conveys an article P loaded thereon in a second conveyance direction (e.g., first transfer direction D2A or second transfer direction D2B that are opposite to each other) that is orthogonal to the first conveyance direction D1. The first transfer direction D2A is, for example, the rightward direction of the conveyor cell 12 as viewed in the first conveyance direction D1. The second transfer direction D2 is, for example, the leftward direction of the conveyor cell 12 as viewed in the first conveyance direction D1. The cross belt mechanism 42 includes a cross belt 61, a driving roller 62, a driven roller 63, a belt support board 64, a motor-side toothed pulley 65, a roller-side toothed pulley 66, a timing belt 67, and a motor 68. As shown in FIG. 4, the cross belt mechanism 42 includes a current sensor 69.

Figure 5:
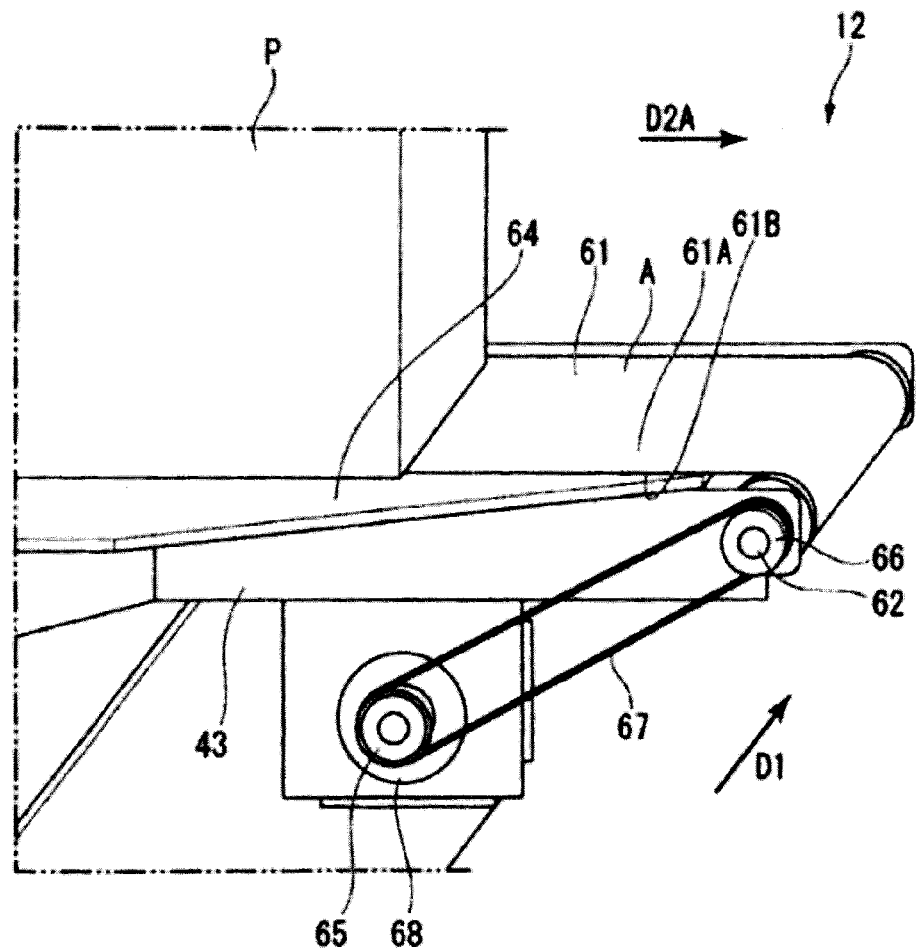
FIG. 5 is a perspective view schematically showing the configuration of a portion of the conveyor cell of the article sorting apparatus according to the embodiment.

The cross belt 61 is a tubular endless belt formed of a flat belt, for example. The surface of the cross belt 61 is coated with a synthetic resin such as polyvinyl chloride, polyurethane, or synthetic rubber, for example. As shown in FIG. 2, the cross belt 61 is stretched between the driving roller 62 and the driven roller 63. The cross belt 61 is rotated by a rotational driving force of the driving roller 62, thereby rotating the driven roller 63. The driving roller 62 and the driven roller 63 are arranged parallel to each other with a predetermined distance left therebetween in the left-right direction (i.e., first transfer direction D2A and second transfer direction D2B) of the conveyor cell 12. As shown in FIGS. 2 and 5, an upper surface of an outside surface 61A of the cross belt 61, a normal to that upper surface extending in the vertically upward direction, forms a load surface A on which an article P is placed. The belt support board 64 supports a portion of an internal surface 61B of the cross belt 61, the portion constituting a back face of the load surface A. Thus, the belt support board 64 prevents bending of the cross belt 61 against the weights of the cross belt 61 and the article P placed on the load surface A.

The driving roller 62 and the driven roller 63 each have a rotation shaft (not shown) that is supported by the frame portion 43. The respective rotation shafts of the driving roller 62 and the driven roller 63 are arranged extending in the front-rear direction (i.e., first conveyance direction D1) of each conveyor cell 12 and parallel to each other with a predetermined distance left therebetween in the left-right direction (i.e., first transfer direction D2A and second transfer direction D2B) of each conveyor cell 12. The motor-side toothed pulley 65 is coaxially connected to the motor 68. The roller-side toothed pulley 66 is coaxially connected to the driving roller 62. The timing belt 67 is a toothed endless belt meshing with the motor-side toothed pulley 65 and the roller-side toothed pulley 66. The timing belt 67 is stretched between the motor-side toothed pulley 65 and the roller-side toothed pulley 66. The timing belt 67 is rotated by a rotational driving force of the motor-side toothed pulley 65, thereby rotating the roller-side toothed pulley 66.

The motor 68 is a servo motor that is controlled by the cell controller 47. The motor 68 is coaxially connected to the motor-side toothed pulley 65. The motor 68 produces a rotational driving force using power that is fed from the noncontact feeding portion 34, and thus rotates the motor-side toothed pulley 65. The timing belt 67 transmits the rotation of the motor-side toothed pulley 65 to the roller-side toothed pulley 66. The roller-side toothed pulley 66 drives and rotates the driving roller 62. The driving roller 62 transmits the rotation to the cross belt 61 and the driven roller 63. Thus, the cross belt 61 is driven in the left-right direction of each conveyor cell 12, thereby transferring the article P placed on the load surface A in the first transfer direction D2A and the second transfer direction D2B. As shown in FIG. 4, the current sensor 69 detects the electric current flowing through the motor 68. For example, the current sensor 69 detects a regenerative current flowing through the motor 68 during deceleration of the motor 68.

As shown in FIG. 3, the battery 44 is provided in the chassis portion 41. The battery 44 stores power that is fed from the noncontact feeding portion 34.

The cell communication portion 46 is provided in the chassis portion 41. The cell communication portion 46 sends/receives various types of information by contactless communication (e.g., infrared communication, wireless communication, or the like) between the controller 17 and the cell controller 47. The cell communication portion 46 receives a driving command from a communication portion 16a. The cell communication portion 46 is operated by power that is fed from the battery 44.

The cell controller 47 may be, for example, a PLC (programmable logic controller), a control board, or the like. The cell controller 47 is fixed to the chassis portion 41. The cell controller 47 is operated by power that is fed from the battery 44. The cell controller 47 controls driving of the motor 68 in accordance with a control instruction that is output from the controller 17. The memory unit 48 is fixed to the chassis portion 41. The memory unit 48 stores various data. For example, the memory unit 48 stores data on a driving pattern that is used by the cell controller 47 when controlling driving of the motor 68.

Figure 6:
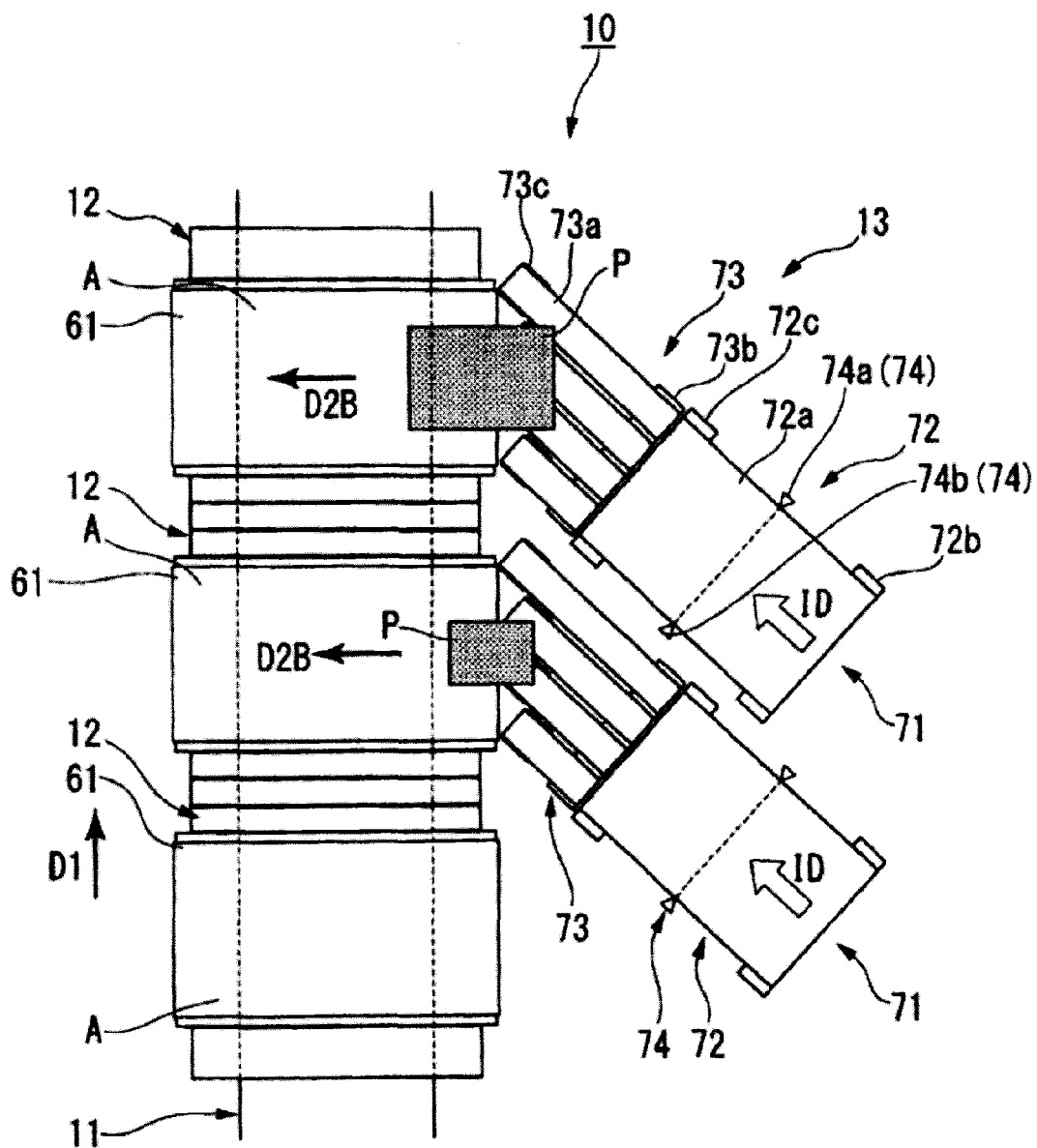
FIG. 6 is a plan view schematically showing the configuration of a loading portion and some of conveyor cells of the article sorting apparatus according to the embodiment.

As shown in FIGS. 1 and 6, the loading portion 13 loads articles P onto the plurality of conveyor cells 12. For example, the loading portion 13 is disposed on an outward side of the conveyance path 11, that is, on the right side of the conveyance path 11 (i.e., the first transfer direction D2A side of the conveyor cells 12) as viewed in the first conveyance direction D1 if the first conveyance direction D1 is a counterclockwise conveyance direction. The loading portion 13 includes at least one or more (e.g., a plurality of) injectors 71. Each of the injectors 71 includes a first conveyance portion 72 and a second conveyance portion 73 that are arranged in a transfer direction ID intersecting the first conveyance direction D1 of the conveyance path 11 at a predetermined acute angle.

The first conveyance portion 72 includes a first transfer belt 72a that is driven in the transfer direction ID as well as a first driving roller 72b and a first driven roller 72c between which the first transfer belt 72a is stretched. The first driving roller 72b and the first driven roller 72c are arranged parallel to each other with a predetermined distance left therebetween in the transfer direction ID. The first transfer belt 72a is rotated by a rotational driving force of the first driving roller 72b, thereby rotating the first driven roller 72c. The second conveyance portion 73 includes a plurality of second transfer belts 73a that are driven in the transfer direction ID. Each of the second transfer belts 73a is formed such that its width (belt width in a direction orthogonal to the transfer direction ID) is smaller than the width of the first transfer belt 72a. The plurality of second transfer belts 73a are arranged at predetermined intervals in the width direction (i.e., the direction orthogonal to the transfer direction ID). Each of the second transfer belts 73a is stretched between a second driving roller 73b and a second driven roller 73c that are arranged parallel to each other with a predetermined distance left therebetween in the transfer direction ID. Each second transfer belt 73a is rotated by a rotational driving force of the second driving roller 73b, thereby rotating the second driven roller 73c. Thus, each injector 71 successively transfers articles P in the transfer direction ID, which intersects the first conveyance direction D1 of the conveyance path 11 at a predetermined acute angle, from the first conveyance portion 72 and the second conveyance portion 73 to desired conveyor cells 12.

Each injector 71 includes an article length sensor 74 that is disposed in the first conveyance portion 72. The article length sensor 74 includes a light emitting portion 74a and a light receiving portion 74b that are arranged opposing each other so as to cross over the first conveyance portion 72. Irradiation light that is output from the light emitting portion 74a is received by the light receiving portion 74b if no article P is present on its optical axis. The article length sensor 74 outputs an ON signal if an article P is present on the optical axis of the irradiation light that is output from the light emitting portion 74a and interrupts the receipt of the irradiation light by the light receiving portion 74b. The article length sensor 74 outputs an OFF signal if no article P is present on the optical axis of the irradiation light that is output from the light emitting portion 74a, and the light receiving portion 74b continues receiving the irradiation light. The article length sensor 74 detects an ON time from the occurrence of switching from the OFF signal to the ON signal to the occurrence of switching from the ON signal to the OFF signal. The article length sensor 74 detects the length of an article P from the detected ON time and a previously known transfer speed of articles P in each injector 71. The article length sensor 74 outputs information on the detected length of the article P to the controller 17.

The article position acquisition portion 14 may be, for example, a high-speed camera that is disposed above the conveyance path 11. The article position acquisition portion 14 detects the position of an article P on the load surface A of each conveyor cell 12 based on image data obtained by imaging that load surface A. For example, the article position acquisition portion 14 detects the position of the article P on the load surface A with respect to the second conveyance direction, and sends information on the detected position to the controller 17. For example, the article position acquisition portion 14 detects the distance d0 between the middle position of the load surface A with respect to the second conveyance direction and the center position of the article P. The article position acquisition portion 14 detects the distance d0 between the middle position of the load surface A and the center position of the article P immediately after the loading portion 13, for example, thereby detecting an offset (=distance d0) of the loading position of the article P that is loaded onto the load surface A in the loading portion 13.

The article position acquisition portion 14 includes an information acquisition portion 14a that is configured integrally therewith, for example. The information acquisition portion 14a includes, for example, an optical character recognition (OCR) device, a code reader that reads a one-dimensional code, a two-dimensional code, or the like, or an RF reader that communicates with an IC tag attached to or incorporated in the article P. The information acquisition portion 14a acquires information given to the article P that is loaded on each conveyor cell 12 and sends the acquired information to the controller 17.

The first sorting portion 15 and the second sorting portion 16 each receive articles P that are individually released from the plurality of conveyor cells 12. Each of the first sorting portion 15 and the second sorting portion 16 includes a plurality of chutes 81 for different classification destinations, the chutes being arranged along the first conveyance direction D1 of the conveyance path 11. For example, each of the first sorting portion 15 and the second sorting portion 16 includes a plurality of chutes 81 on the inward side and the outward side of the conveyance path 11, that is, on the right side and the left side of the conveyance path 11 as viewed in the first conveyance direction D1 when the first conveyance direction D1 is the counterclockwise conveyance direction.

The controller 17 performs overall control of the article sorting apparatus 10. The controller 17 controls the state of the electric current flowing through the electromagnetic coil 32 of the linear synchronous motor 31, thereby controlling acceleration, deceleration, stop (emergency stop etc.), and the like of each conveyor cell 12. The controller 17 stores layout information (e.g., positions of the first to fourth curves 21 to 24, the loading portion 13, the first sorting portion 15, and the second sorting portion 16 on the conveyance path 11, directions and curvature radii of the first to fourth curves 21 to 24, and the like) of the article sorting apparatus 10 in advance. The controller 17 manages information on the article P (e.g., classification destination (sorting destination), weight, and the like of the article P) that is acquired by the information acquisition portion 14a and various types of information regarding the article P, such as the length of the article P that is detected by the article length sensor 74.

The controller 17 communicates with each of the loading portion 13, the article position acquisition portion 14, the first sorting portion 15, and the second sorting portion 16 in a wired manner or in a wireless manner to send/receive various types of information. The controller 17 controls the operation of each of the loading portion 13, the article position acquisition portion 14, the first sorting portion 15, and the second sorting portion 16 by sending control instructions to these portions. The controller 17 sends/receives various types of information by performing noncontact communication with the respective cell controllers 47 of the plurality of conveyor cells 12. The controller 17 sends a control instruction to each cell controller 47, the control instruction instructing the control operation of the cell controller 47.

The controller 17 synchronizes the acceleration/deceleration driving and stopping operations of the cross belt 61 by the motor 68 of each conveyor cell 12 with the transferring operation of an article P by each injector 71 so that the article P is delivered from the injector 71 of the loading portion 13 to the corresponding conveyor cell 12. The controller 17 sends a control instruction to the cell controller 47 of each conveyor cell 12, the control instruction instructing execution of a series of receiving operations by acceleration/deceleration driving and stopping of the cross belt 61 by the motor 68 of the conveyor cell 12. The controller 17 sends information on the length of the article P, which is detected by the article length sensor 74, to the cell controller 47 of each conveyor cell 12 together with the control instruction that instructs execution of the receiving operations.

When instructed by the controller 17 to execute the receiving operations, the cell controller 47 of each conveyor cell 12 controls driving of the motor 68 using the data on the control pattern, which is stored in the memory unit 48 in advance, and the information on the length of the article P. The cell controller 47 of each conveyor cell 12 controls acceleration/deceleration driving and stopping of the motor 68, thereby controlling the receipt and retention of the article P by the cross belt 61. The cell controller 47 of each conveyor cell 12 controls the motor 68 such that the center position of the article P coincides with a predetermined position (e.g., middle position or the like of the load surface A with respect to the left-right direction of each conveyor cell 12) on the load surface A and the article P is retained in this state. The cell controller 47 stores predetermined data in advance, the predetermined data indicating, for example, the correspondence relationship between the angle of rotation of the motor 68 and the amount for which the cross belt 61 is moved. The cell controller 47 moves the cross belt 61 and the article P for a desired distance by controlling the angle of rotation of the motor 68 based on the predetermined data stored therein. Thus, the loading portion 13 transfers the article P from each injector 71 onto the load surface A of each conveyor cell 12.

The controller 17 acquires information on the article P that is loaded on the load surface A of each conveyor cell 12 by the loading portion 13 from the information acquisition portion 14a. The controller 17 determines the classification destination of the article P based on the information on the article P that is received from the information acquisition portion 14a, and selects the chute 81 corresponding to the determined classification destination from the plurality of chutes 81 of the first sorting portion 15 and the second sorting portion 16. The controller 17 sets the timing of driving of the cross belt 61 by the motor 68 of each conveyor cell 12 (i.e., timing at which the article P is loaded into the chute 81) such that the article P is loaded into the selected chute 81 from the conveyor cell 12. The controller 17 sends a control instruction to the cell controller 47 of each conveyor cell 12, the control instruction instructing the timing of driving of the cross belt 61 by the motor 68 of the conveyor cell 12.

The cell controller 47 of each conveyor cell 12 controls driving of the motor 68 using the driving timing that is specified by the controller 17, the data on the control pattern of the discharging operation that is stored in the memory unit 48 in advance, the information on the weight of the article P, and the like. The cell controller 47 of each conveyor cell 12 controls loading of the article P into the chute 81 by the cross belt 61. Thus, each of the first sorting portion 15 and the second sorting portion 16 sorts the article P of each conveyor cell 12 in accordance with its classification destination corresponding to the information on the article P.

Before each conveyor cell 12 enters any curve of the conveyance path 11, the controller 17 instructs the cell controller 47 to adjust the position of the article P on the load surface A of the conveyor cell 12 to a predetermined position in accordance with the curvature radius of that curve. In accordance with the curvature radius of the curve, the controller 17 moves the position of the article P on the load surface A to a position that is offset from the middle position in the second conveyance direction. If the curvature radius of the curve is less than a first threshold value, the controller 17 moves the article P such that the position of the article P when the conveyor cell 12 enters the curve is offset from the middle position to an inward side with respect to the radial direction of the curve by a predetermined distance d1. On the other hand, if the curvature radius of the curve is not less than the first threshold value, the controller 17 moves the article P such that the position of the article P at this point in time is maintained or the position of the article P is moved to the middle position on the load surface A. It should be noted that if a first curve having a curvature radius that is not less than the first threshold value is followed by a downstream second curve having a curvature radius that is less than the first threshold value, the controller 17 may move the position of the article P at (or before) the first curve to a position that is offset from the middle position on the load surface A to the inward side with respect to the radial direction by the predetermined distance d1.

The controller 17 sets the first threshold value with respect to the curvature radius R of a curve in accordance with the length LA of the load surface A of each conveyor cell 12 in the second conveyance direction. For example, the controller 17 sets the first threshold value with respect to the curvature radius R of a curve in correspondence with a predetermined threshold value with respect to the ratio between the curvature radius R of the curve and the length LA. The controller 17 sets the first threshold value with respect to the curvature radius R of a curve in correspondence with setting of the ratio (LA:R) between the length LA and the curvature radius R of the curve to about 1:7 to 1:10, for example.

For example, ignoring air resistance of the article P, the controller 17 sets the requirement (stationary requirement) for the article P to be stationary on the load surface A at a curve to "maximum friction force G>centrifugal force F". The controller 17 sets the maximum friction force $G=\mu Mg$ and the centrifugal force $F=Mr\omega^2=Mr(V/R)^2$ using the weight M of the article P, the conveyance speed V, and the radius of gyration "r" of the article P at the curve, as well as the coefficient $\mu$ of friction between an under surface of the article P and the load surface A, and the gravitational acceleration "g". The conveyance speed of each conveyor cell 12 in a curve is the same as the conveyance speed V at the center position thereof with respect to the second conveyance direction, and the angular speed $\omega$ is $\omega=V/R$. That is to say, each conveyor cell 12 passing through the curve performs a rotational motion about the center of the curve at the angular speed $\omega$. The article P that is stationary on the load surface A of each conveyor cell 12 also performs a rotational motion at the angular speed $\omega$ like the conveyor cell 12. While the angular speed $\omega$ of the article P depends on the curvature radius R of the curve, the centrifugal force F acting on the article P depends on the radius of gyration "r" of the article P. Thus, the stationary requirement becomes $\mu g>r(V/R)^2$, and does no longer depend on the weight M of the article P. When the angular speed $\omega$, the friction coefficient $\mu$, and the gravitational acceleration "g" are respectively constants, the controller 17 takes into account that the smaller the radius of gyration "r" of the article P at the curve, the more easily the article P becomes stationary on the load surface A due to a reduction in the centrifugal force F.

If the ratio between the curvature radius R and the length LA is less than a predetermined threshold value, the controller 17 takes into account that reducing the centrifugal force F by reducing the radius of gyration "r" by moving the article P on the load surface A is effective for fulfillment of the stationary requirement. On the other hand, if the ratio between the curvature radius R and the length LA is not less than the predetermined threshold value, the controller 17 takes into account that even when the radius of gyration "r" is reduced by moving the article P on the load surface A, the centrifugal force F is reduced only slightly.

Before a given conveyor cell 12 enters the first sorting portion 15 and the second sorting portion 16 on the conveyance path 11, the controller 17 moves the position of the article P on the load surface A of the conveyor cell 12 to a position that is offset from the middle position in the second conveyance direction. The controller 17 moves the article P such that when the conveyor cell 12 enters each of the first sorting portion 15 and the second sorting portion 16, the article P is located at a position that is offset from the middle position to a side that is closer to the chute 81 corresponding to the classification destination of the article P by a predetermined distance d1 in the second conveyance direction.

With respect to the movement of the article P on the load surface A that is instructed by the controller 17, the cell controller 47 of the conveyor cell 12 moves the article P by the predetermined distance d1 that is set in advance, until an end portion of the article P comes into contact with a first end portion or a second end portion with respect to the second conveyance direction. In accordance with a control instruction from the controller 17, each cell controller 47 moves the article P on the load surface A when the loading portion 13 loads the article P onto the conveyor cell 12 or immediately after the conveyor cell 12 passes through a curve that is located upward of a target curve.

Figure 7:
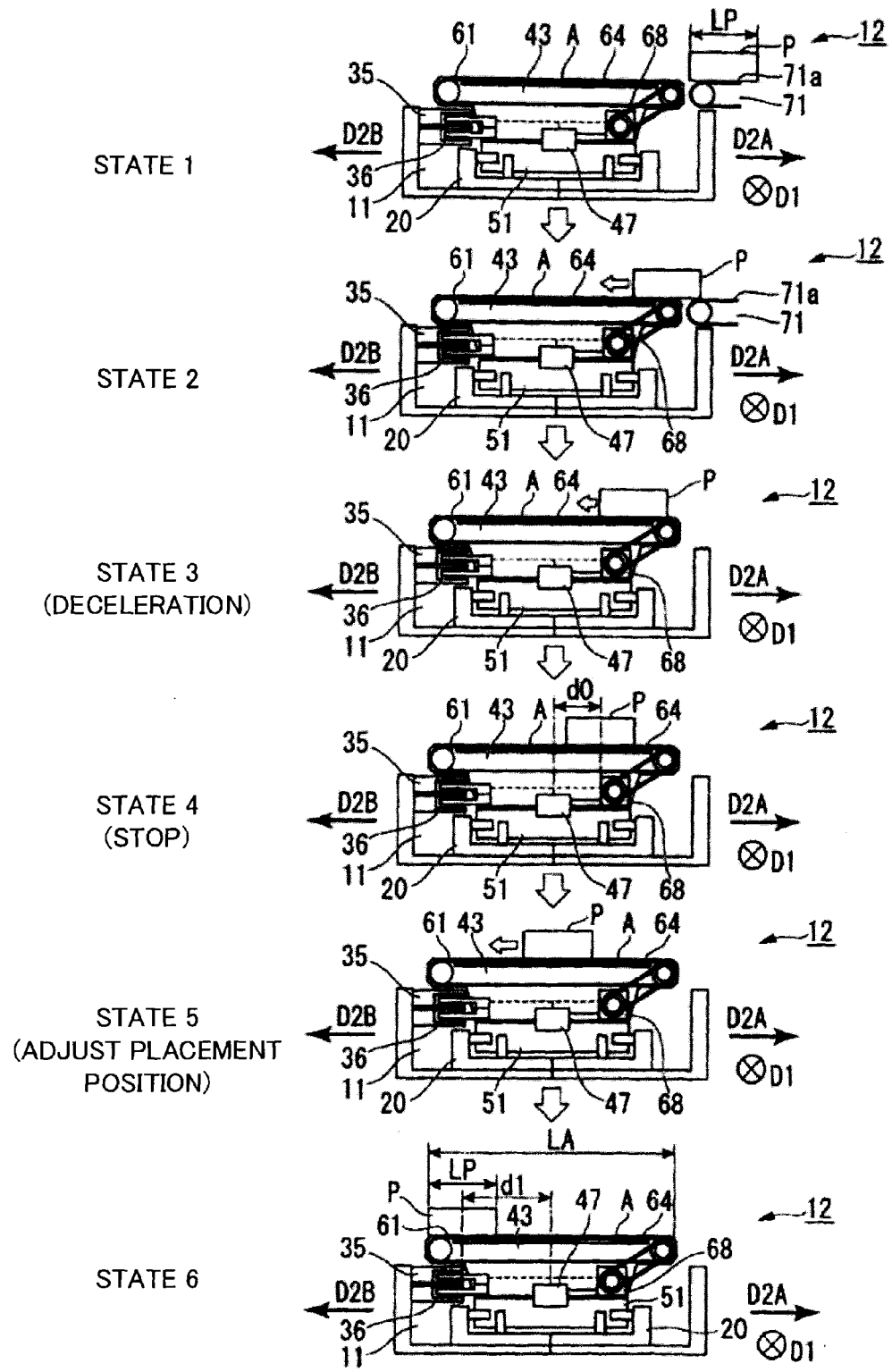
FIG. 7 shows side views illustrating changes from State 1 to State 6 that are caused by an example of the operation of the article sorting apparatus according to the embodiment.

Hereinafter, the operation of the article sorting apparatus 10 according to the above-described embodiment will be described. In the following description, the operations over time of a single conveyor cell 12 of the plurality of conveyor cells 12 circulating through the conveyance path 11 shown in FIG. 1, for example, will be described with reference to FIG. 7. The conveyor cells 12 other than the single conveyor cell 12 described below perform the same operations as the single conveyor cell 12 described below.

In the following description, each conveyor cell 12 moves along the conveyance path 11 at a constant conveyance speed V (e.g., a predetermined speed within a range of about 2.0 to 4.0 m/s, etc.). The article P loaded on each conveyor cell 12 is sorted to any chute 81 of the first sorting portion 15 and the second sorting portion 16.

When a conveyor cell 12 on which no article P is loaded enters the loading portion 13, the controller 17 instructs the loading portion 13 to deliver an article P to that conveyor cell 12. The controller 17 instructs the cell controller 47 of that conveyor cell 12 to control driving of the cross belt 61 by the motor 68 in synchronization with transfer of the article P by a certain injector 71 of the loading portion 13. The controller 17 instructs the cell controller 47 to draw the article P from the injector 71 onto the load surface A of the cross belt 61 and to move the article P on the load surface A as appropriate for the first curve 21.

The loading portion 13 loads the article P onto the conveyor cell 12 in accordance with the control instruction from the controller 17. The injector 71 of the loading portion 13 transfers the article P toward the conveyor cell 12 by driving of the transfer belt 71a. The injector 71 sets a component in the first conveyance direction D1 of the transfer speed of the article P to be equal to the speed of the conveyor cell 12 in the first conveyance direction D1 (State 1). In State 1, the article length sensor 74 detects the length LP of the article P from the ON time between the occurrence of switching from an OFF signal to an ON signal and the occurrence of switching from the ON signal to an OFF signal as well as the previously known transfer speed of articles P in each injector 71. The article length sensor 74 outputs information on the detected length LP of the article P to the controller 17.

The cell controller 47 of the conveyor cell 12 draws the article P from the injector 71 onto the load surface A of the cross belt 61 in accordance with the instruction from the controller 17. The cell controller 47 sets the driving speed of the load surface A of the cross belt 61 to be equal to a second conveyance direction component of the speed of transfer of the article P by the injector 71. The loading portion 13 is disposed on the right side of the conveyance path 11 (on the first transfer direction D2A side of the conveyor cell 12) as viewed in the first conveyance direction D1. Thus, the cell controller 47 drives the load surface A of the cross belt 61 in the second transfer direction D2B and sets the driving speed of the cross belt 61 to be equal to the component in the second transfer direction D2B of the speed of transfer of the article P by the injector 71 (State 2).

It should be noted that if the loading portion 13 is disposed on the left side of the conveyance path 11 (on the second transfer direction D2B side of the conveyor cell 12) as viewed in the first conveyance direction D1, the cell controller 47 drives the load surface A of the cross belt 61 in the first transfer direction D2A. Thus, the cell controller 47 sets the driving speed of the cross belt 61 in the first transfer direction D2A to be equal to the component in the first transfer direction D2A of the speed of transfer of the article P by the injector 71.

Next, the cell controller 47 performs deceleration control of the cross belt 61 such that the article P stops at the middle position on the load surface A, based on the data on the control pattern with respect to an article P having a typical weight, which is stored in the memory unit 48 in advance (State 3). The controller 17 decelerates the first conveyance direction component of the transfer speed of the article P of the injector 71 similarly to the driving speed of the load surface A of the cross belt 61. The typical weight of articles P may be a predetermined weight between 5 and 20 kg, for example.

If a large difference is present between the typical weight of articles P that is stored in the memory unit 48 in advance and the weight of an article P that is actually transferred, the article P may stop at a loading position that is offset from the middle position of the load surface A due to a variation in the behavior, such as rising and falling, of the rotation speed of the motor 68. If an inertial force that is larger than the maximum friction force of the article P on the load surface A is applied due to acceleration/deceleration of the motor 68, the article P slides on the load surface A, and thus the article P may stop at a loading position that is offset from the middle position of the load surface A. In the following description, it is assumed that the distance d0 between the middle position of the load surface A and the center position of the article P is the offset d0 of the loading position of the article P (State 4). It should be noted that the position at which the article P loaded from the loading portion 13 onto the load surface A stops is referred to as the "loading position".

With respect to each conveyor cell 12 that is conveyed from the loading portion 13, the controller 17 detects the offset d0 of the loading position of the article P using the article position acquisition portion 14. The controller 17 instructs the cell controller 47 to adjust the placement position of the article P on the load surface A based on the offset d0 of the loading position of the article P, which is detected by the article position acquisition portion 14, and the curvature radius of the closest curve, that is, the curvature radius R1 of the first curve 21. The cell controller 47 controls driving of the cross belt 61 so as to adjust the placement position of the article P on the load surface A in accordance with the instruction from the controller 17 (State 5). It should be noted that the position to which the article P is moved on the load surface after loading of the article P is referred to as the "placement position".

Since the curvature radius R1 of the first curve 21 is less than the first threshold value, the cell controller 47 drives the cross belt 61 such that the center position of the article P is adjusted to a position that is offset from the middle position of the load surface A to the inward side with respect to the radial direction of the first curve 21 by the predetermined distance d1. The predetermined distance d1 is, for example, d1=(LA−LP)/2 based on the previously known length LA of the load surface A in the second conveyance direction and the detected length LP of the article P. As shown in State 4, if the offset d0 of the loading position is formed on the near side of the middle position of the load surface A with respect to the driving direction (second transfer direction D2B) of the cross belt 61, the cell controller 47 moves the article P for the sum (=d1+d0) of the predetermined distance d1 and the offset d0 of the loading position. If the offset d0 of the loading position is formed on the far side of the middle position of the load surface A with respect to the driving direction (second transfer direction D2B) of the cross belt 61, the cell controller 47 moves the article P for the difference (=d1−d0) between the predetermined distance d1 and the offset d0 of the loading position. Before the conveyor cell 12 enters the first curve 21, the cell controller 47 moves the article P until an end portion of the article P comes into contact with the end portion (second end portion) of the load surface A with respect to the second transfer direction D2B. The cell controller 47 stores the position at which the article P stops (State 6).

Figure 8:
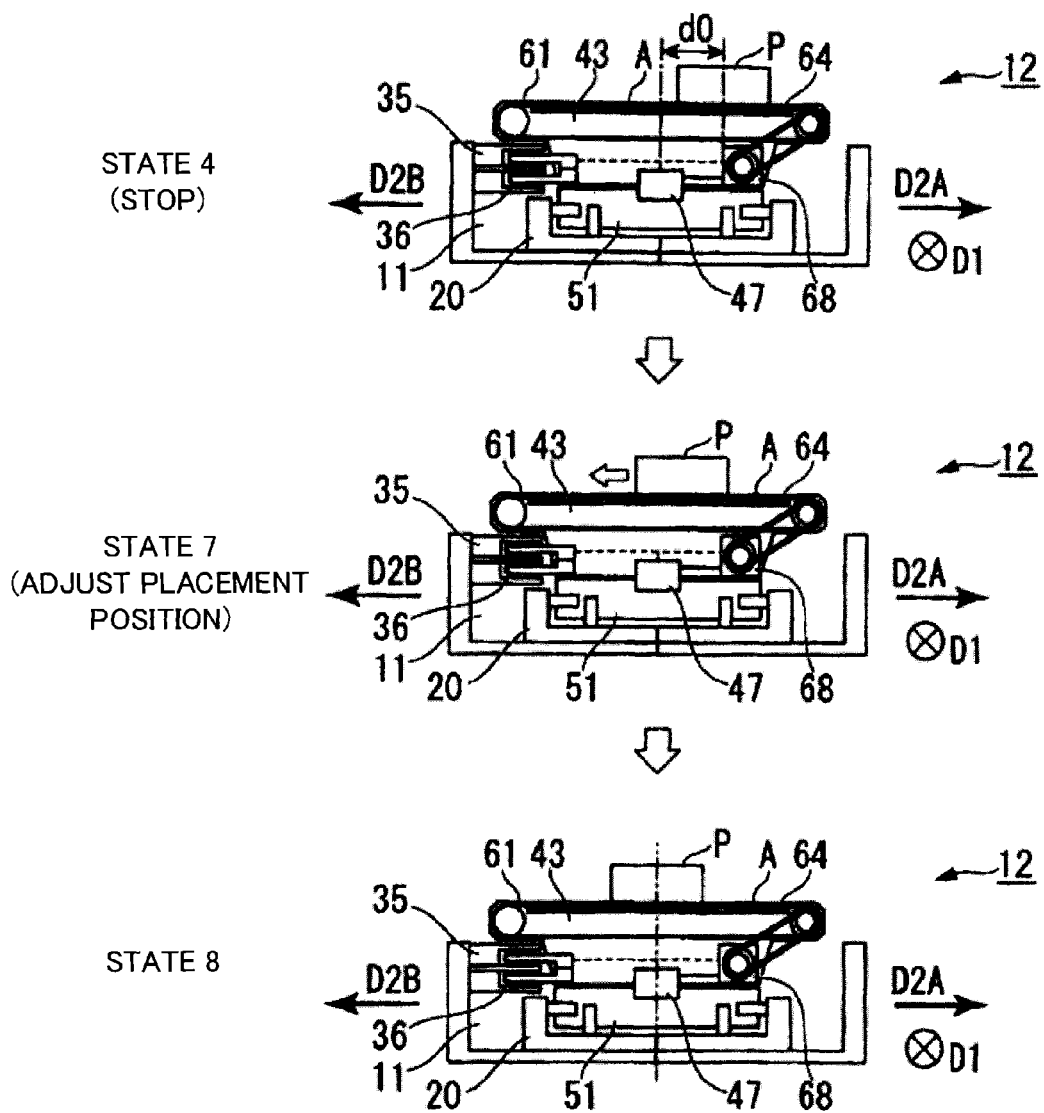
FIG. 8 shows side views illustrating changes in State 4, State 7, and State 8 that substitute for the changes from State 4 to State 6 shown in FIG. 7.

It should be noted that, for example, if the curvature radius R1 of the first curve 21 is not less than the first threshold value, the cell controller 47 may move the article P such that the placement position of the article P on the load surface A is moved from that in State 7 in FIG. 8 to a substantially middle position shown in State 8. The cell controller 47 may also maintain the placement position of the article P on the load surface A at this point in time.

Figure 9:
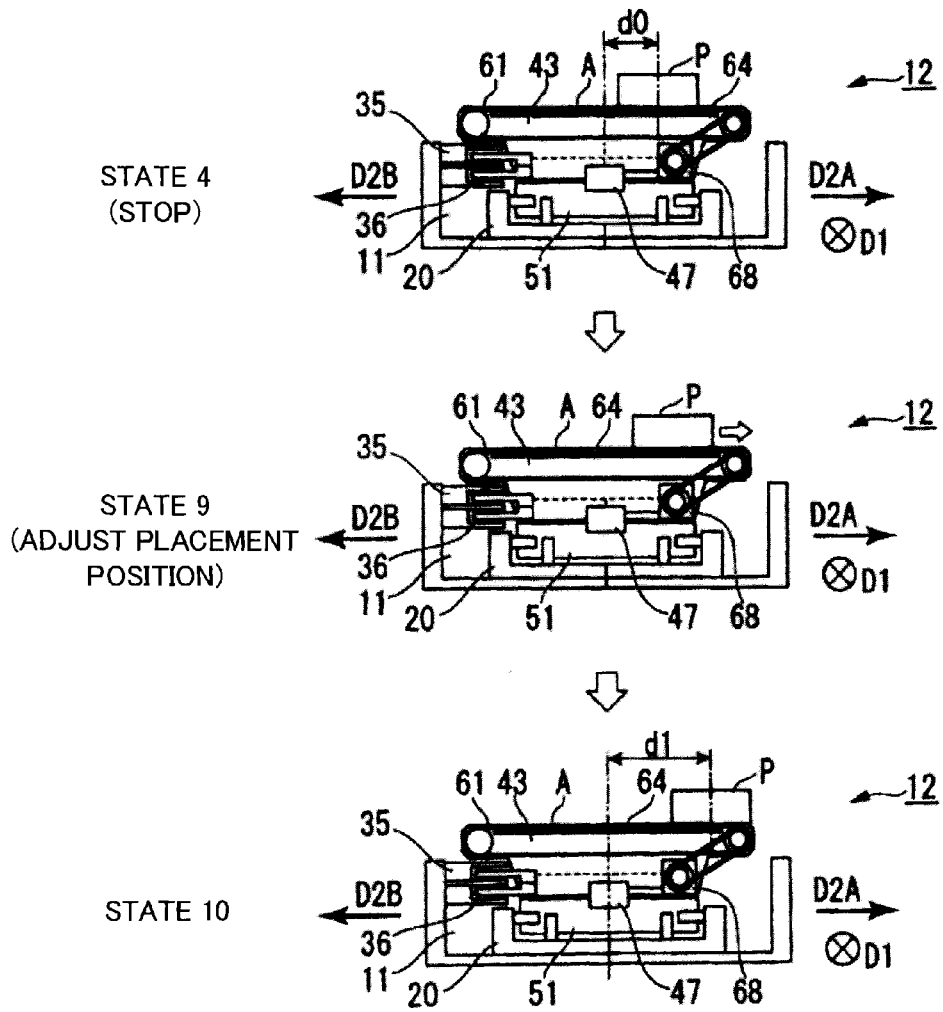
FIG. 9 shows side views illustrating changes in State 4, State 9, and State 10 that substitute for the changes from State 4 to State 6 shown in FIG. 7.

It should be noted that, for example, if the curvature radius R1 of the first curve 21 is not less than the first threshold value, and the chute 81 corresponding to the classification destination of the article P is present in the first sorting portion 15, the cell controller 47 may move the position of the article P to a position that is appropriate for the position of that chute 81 relative to the conveyance path 11. As in State 9 and State 10 shown in FIG. 9, the cell controller 47 drives the cross belt 61 such that the center position of the article P is adjusted to a position that is offset from the middle position of the load surface A to a side closer to the chute 81 by the predetermined distance d1. For example, before the conveyor cell 12 enters the first curve 21, the cell controller 47 moves the article P until an end portion of the article P comes into contact with the end portion (first end portion) of the load surface A with respect to the first transfer direction D2A.

When the conveyor cell 12 on which the article P is loaded has passed through the first curve 21 (e.g., immediately after passing therethrough), the controller 17 instructs the cell controller 47 to adjust the position of the article P on the load surface A to a predetermined position appropriate for the first sorting portion 15 or the second curve 22.

If the chute 81 corresponding to the classification destination of the article P loaded on the conveyor cell 12 is present in the first sorting portion 15, the controller 17 adjusts the position of the article P on the load surface A to a predetermined position appropriate for the position of the chute 81 relative to the conveyance path 11. The predetermined position is the position at which the center position of the article P is offset from the middle position of the load surface A to the side closer to the chute 81 by the predetermined distance d1. The cell controller 47 stores the position at which the article P stops.

For example, if the chute 81 is located on the right side of the conveyance path 11 as viewed in the first conveyance direction D1, the cell controller 47 adjusts the position of the article P when the conveyor cell 12 enters the first sorting portion 15 to a position at which the end portion of the article P comes into contact with the first end portion of the load surface A with respect to the first transfer direction D2A. For example, if the chute 81 is located on the left side of the conveyance path 11 as viewed in the first conveyance direction D1, the cell controller 47 adjusts the position of the article P when the conveyor cell 12 enters the first sorting portion 15 to a position at which the end portion of the article P comes into contact with the second end portion of the load surface A with respect to the second transfer direction D2B.

When the conveyor cell 12 on which the article P is loaded enters the first sorting portion 15 having the chute 81 corresponding to the classification destination of the article P, the controller 17 instructs the cell controller 47 of the conveyor cell 12 to release the article P into the chute 81. The cell controller 47 of the conveyor cell 12 drives the cross belt 61 in accordance with the instruction from the controller 17 and releases the article P on the load surface A of the cross belt 61 into the chute 81.

If the chute 81 corresponding to the classification destination of the article P loaded on the conveyor cell 12 is not present in the first sorting portion 15, the controller 17 adjusts the position of the article P on the load surface A to a predetermined position appropriate for the second curve 22. In accordance with the control instruction from the controller 17, the cell controller 47 controls driving of the cross belt 61, if necessary, such that the position of the article P on the load surface A is adjusted to the predetermined position that is appropriate for the curvature radius R2 of the second curve 22. Since the curvature radius R2 of the second curve 22 is not less than the first threshold value, the cell controller 47 does not execute control of driving of the cross belt 61 appropriate for the curvature radius R2 of the second curve 22. If the chute 81 corresponding to the classification destination of the article P is present in the second sorting portion 16 downstream of the second curve 22, the cell controller 47 adjusts the position of the article P to a position that is appropriate for the position of the chute 81 relative to the conveyance path 11. The cell controller 47 drives the cross belt 61 such that the center position of the article P is adjusted to a position that is offset from the middle position of the load surface A to a side closer to the chute 81 by the predetermined distance d1. Before the conveyor cell 12 enters the second curve 22, the cell controller 47 controls driving of the cross belt 61 in such a manner as to move the article P until an end portion of the article P comes into contact with an end portion (first or second end portion) of the load surface A that is closer to the classification destination.

It should be noted that, for example, if the curvature radius R2 of the second curve 22 is less than the first threshold value, the cell controller 47 drives the cross belt 61 such that the center position of the article P is adjusted to a position that is offset from the middle position of the load surface A to the inward side with respect to the radial direction of the second curve 22 by the predetermined distance d1. Thus, the cell controller 47 adjusts the position of the article P on the load surface A when the conveyor cell 12 enters the second curve 22 to the inner end portion with respect to the radial direction of the second curve 22.

When the conveyor cell 12 on which the article P is loaded has passed through the second curve 22 (e.g., immediately after passing therethrough), the controller 17 instructs the cell controller 47 to adjust the position of the article P on the load surface A to a predetermined position that is appropriate for the second sorting portion 16. The controller 17 adjusts the position of the article P on the load surface A to the predetermined position that is appropriate for the position of the chute 81 relative to the conveyance path 11. The controller 17 adjusts the position of the article P on the load surface A to a position that is offset from the middle position to a side closer to the chute 81. In accordance with the control instruction from the controller 17, the cell controller 47 controls driving of the cross belt 61, if necessary, such that the position of the article P on the load surface A when the conveyor cell 12 enters the second sorting portion 16 is adjusted to a position that is offset from the middle position to the side closer to the chute 81. The predetermined position is the position at which the center position of the article P is offset from the middle position of the load surface A to the side closer to the chute 81 by the predetermined distance d1. The cell controller 47 stores the position at which the article P stops.

For example, if the chute 81 is located on the right side of the conveyance path 11 as viewed in the first conveyance direction D1, the cell controller 47 adjusts the position of the article P when the conveyor cell 12 enters the second sorting portion 16 to a position at which the end portion of the article P comes into contact with the first end portion of the load surface A with respect to the first transfer direction D2A. For example, if the chute 81 is located on the left side of the conveyance path 11 with respect to the first conveyance direction D1, the cell controller 47 adjusts the position of the article P when the conveyor cell 12 enters the second sorting portion 16 to a position at which the end portion of the article P comes into contact with the second end portion of the load surface A with respect to the second transfer direction D2B.

When the conveyor cell 12 on which the article P is loaded enters the second sorting portion 16 having the chute 81 corresponding to the classification destination of the article P, the controller 17 instructs the cell controller 47 of the conveyor cell 12 to release the article P into the chute 81. The cell controller 47 of the conveyor cell 12 drives the cross belt 61 in accordance with the instruction from the controller 17 and releases the article P on the load surface A of the cross belt 61 into the chute 81.

According to the above-described embodiment, the position of the article P on the load surface A is shifted before entry into a curve, and thus the article P can properly pass through curves of various shapes. With the controller 17 that moves the position of the article P on the load surface A to a position that is offset from the middle position in the second conveyance direction in accordance with the curvature radius of a curve, the position of the article P can be made appropriate in accordance with the centrifugal force acting on the article P and the friction force between the article P and the load surface A. With the controller 17 that makes the position of the article P on the load surface A appropriate for curves of various shapes, the necessity to increase the curvature radius of each curve is eliminated, so that the size of the article sorting apparatus 10 can be reduced. Moreover, even an article P with a high center of gravity does not fall over, or even a round article P can be prevented from rolling. Furthermore, the necessity to reduce the conveyance speed of each conveyor cell 12 is eliminated, so that the processing speed of the article sorting apparatus 10 can be increased.

Furthermore, with the controller 17 that adjusts the position of the article P on the load surface A to a position that is offset from the middle position to the inward side with respect to the radial direction of a curve if the curvature radius of the curve is less than the first threshold value, the centrifugal force of the article P can be significantly reduced by reducing the radius of gyration of the article P. With the controller 17 that reduces the centrifugal force acting on the article P if the curvature radius of a curve is less than the first threshold value, the centrifugal force of the article P is prevented from becoming larger than the friction force between the article P and the load surface A, so that the article P can be prevented from starting to slide on the load surface A.

Furthermore, with the controller 17 that sets the first threshold value in accordance with the length LA of the load surface A and the curvature radius R of a curve, it is possible to properly discriminate between a curve with respect to which a reduction in the centrifugal force of the article is effective and a curve with respect to which an increase in the moving distance of the article on the load surface A is effective.

Furthermore, with the controller 17 that adjusts the position of the article P on the load surface A of each conveyor cell 12 to a position that is offset to a side closer to the chute 81 corresponding to the classification destination of the article P, the working efficiency of the article sorting apparatus 10 can be improved. Furthermore, the time that is taken to load the article P into the chute 81 can be reduced, so that the load on the motor 68 during loading of the article P into the chute 81 can be reduced. Furthermore, with the controller 17 that adjusts the position of the article P on the load surface A to a position that is offset from the middle position to a side closer to the classification destination of the article P that is present downstream of a curve if the curvature radius of that curve is not less than the first threshold value, the working efficiency of the article sorting apparatus 10 can be improved.

Furthermore, with the controller 17 that sets the position that is offset from the middle position on the load surface A with respect to the second conveyance direction to be the position at which the end portion of the article P comes into contact with the first end portion or the second end portion of the load surface A, the centrifugal force of the article P at the curve is significantly reduced, so that the operation efficiency at the chute 81 can be improved.

Furthermore, with the controller 17 that, if the curvature radius of the curve is not less than the first threshold value, shifts the position of the article P on the load surface A to the middle position or maintains the position of the article P at this point in time, excessive shifting of the position of the article P can be prevented if the centrifugal force of the article P is minute.

Furthermore, with the controller 17 that moves the article P based on the offset d0 of the loading position, which is detected by the article position acquisition portion 14, the length LP of the article P, which is detected by the article length sensor 74, and the known length LA of the load surface A, the positional accuracy of the article P can be improved.

Furthermore, with the noncontact feeding portion 34 that feeds power from the conveyance path 11 to each conveyor cell 12 in a contactless manner, power can be easily fed to each of the plurality of conveyor cells 12 moving along the conveyance path 11. Furthermore, with the controller 17 that sets the position of the article P on the load surface A when the article P is transferred from the loading portion 13 to the conveyor cell 12, it is possible to move the article P on the load surface A using the power that is fed in order to transfer the article P. Furthermore, with the controller 17 that sets the position of the article P on the load surface A immediately after the article P has passed through a curve upstream of the target curve, early setting of the position of the article P on the load surface A can be performed.

Figure 10:
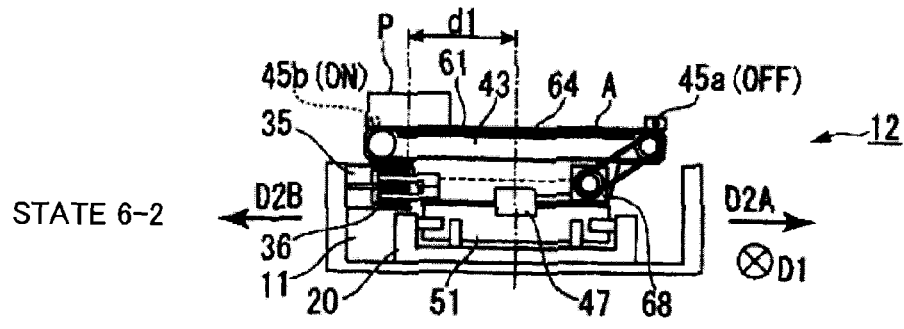
FIG. 10 shows side views illustrating State 6-2 and State 10-2 that are created by an example of the operation of an article sorting apparatus according to a first modification of the embodiment.
Figure 10:
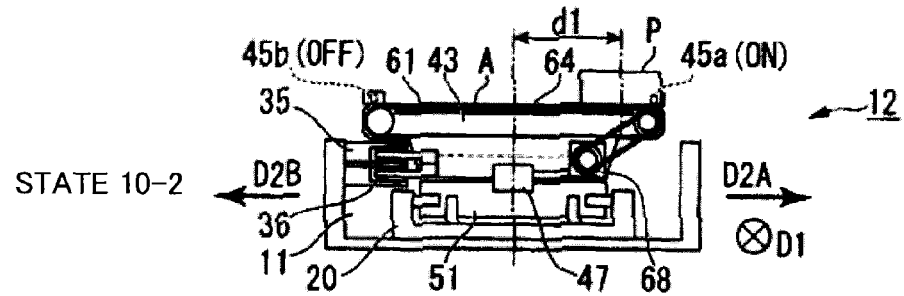

Hereinafter, modifications will be described. In the foregoing embodiment, the article position acquisition portion 14 that detects the position of the article P on the load surface A of each conveyor cell 12 is provided; however, the present invention is not limited to this. In the article sorting apparatus 10 according to a first modification of the embodiment, each conveyor cell 12 may include a first optical sensor 45a and a second optical sensor 45b that are provided in the frame portion 43, as shown in FIG. 10. It should be noted that State 6-2 and State 10-2 shown in FIG. 10 correspond to State 6 shown in FIG. 7 and State 9 shown in FIG. 9 that are described above. The first optical sensor 45a is disposed at the first end portion of the load surface A with respect to the second conveyance direction or a position that is offset from the middle position thereof toward the first end portion. The second optical sensor 45b is disposed at the second end portion of the load surface A with respect to the second conveyance direction or a position that is offset from the middle position thereof toward the second end portion. For example, the first optical sensor 45a and the second optical sensor 45b may be optical sensors of a transmission type, a reflection type, a proximity type, or the like.

For example, the first optical sensor 45a has its optical axis at the first end portion of the load surface A with respect to the first transfer direction D2A, the optical axis being located above the load surface A and extending in the front-rear direction that is orthogonal to the first transfer direction D2A. The second optical sensor 45b has its optical axis at the second end portion of the load surface A with respect to the second transfer direction D2B, the optical axis being located above the load surface A and extending in the front-rear direction that is orthogonal to the second transfer direction D2B. The first optical sensor 45a and the second optical sensor 45b are operated by power that is fed from the battery 44.

Each of the first optical sensor 45a and the second optical sensor 45b includes, if the optical sensors are optical sensors of a transmission type, for example, a light emitting portion and a light receiving portion that are arranged opposing each other in the front-rear direction that is orthogonal to the first transfer direction D2A and the second transfer direction D2B. Irradiation light that is output from the light emitting portion is received by the light receiving portion if no article P is present on the optical axis. Each of the first optical sensor 45a and the second optical sensor 45b outputs an ON signal if an article P is present on the optical axis of the irradiation light that is output from the light emitting portion, and the receipt of the irradiation light by the light receiving portion is thus interrupted. Each of the first optical sensor 45a and the second optical sensor 45b outputs an OFF signal if no article P is present on the optical axis of the irradiation light that is output from the light emitting portion, and the light receiving portion continues receiving the irradiation light.

In accordance with a control instruction that is output from the controller 17, the cell controller 47 of each conveyor cell 12 controls driving of the motor 68 in accordance with the ON/OFF signal that is output from each of the first optical sensor 45a and the second optical sensor 45b. With respect to the movement of the article P on the load surface A that is instructed by the controller 17, the cell controller 47 moves the article P until the article P is detected by the first optical sensor 45a or the second optical sensor 45b.

For example, during delivery of the article P from each injector 71 of the loading portion 13 to a given conveyor cell 12, the cell controller 47 detects the transfer state of the article P in accordance with a change in the output of the first optical sensor 45a on the side closer to the injector 71 with respect to the second conveyance direction. If the output of the first optical sensor 45*a* changes from the OFF signal to the ON signal, the cell controller 47 detects that loading of the article P onto the first end portion on the load surface A is started. Next, if the output of the first optical sensor 45*a* changes from the ON signal to the OFF signal, the cell controller 47 detects that the article P has been loaded to the middle position side with respect to the first end portion of the load surface A. The loading portion 13 stops driving of the injector 71 if the cell controller 47 detects that the entire article P is placed on the middle position side with respect to the first end portion of the load surface A.

The cell controller 47, when moving the position of the article P on the load surface A to a position that is offset from the middle position in the second conveyance direction, controls driving of the cross belt 61 in accordance with the ON/OFF signal output from each of the first optical sensor 45*a* and the second optical sensor 45*b*. For example, the cell controller 47 uses the ON/OFF signal of each of the first optical sensor 45*a* and the second optical sensor 45*b* when moving the article P on the load surface A as appropriate for each curve on the conveyance path 11 and the chute 81 corresponding to the classification destination of the article P.

For example, the cell controller 47 drives the cross belt 61 in the first transfer direction D2A until the output of the first optical sensor 45*a* changes from the OFF signal to the ON signal. If the output of the first optical sensor 45*a* changes from the OFF signal to the ON signal, the cell controller 47 judges that the article P has reached the first end portion on the load surface A and stops driving of the cross belt 61. For example, the cell controller 47 drives the cross belt 61 in the second transfer direction D2B until the output of the second optical sensor 45*b* changes from the OFF signal to the ON signal. If the output of the second optical sensor 45*b* changes from the OFF signal to the ON signal, the cell controller 47 judges that the article P has reached the second end portion on the load surface A and stops driving of the cross belt 61.

For example, since the curvature radius R1 of the first curve 21 is less than the first threshold value, before the entry of the conveyor cell 12 into the first curve 21, the cell controller 47 drives the cross belt 61 in the second transfer direction D2B until the output of the second optical sensor 45*b* changes from the OFF signal to the ON signal. If the output of the second optical sensor 45*b* changes from the OFF signal to the ON signal, the cell controller 47 stops driving of the cross belt 61, thereby stopping the article P in a state in which the end portion of the article P is in contact with the second end portion of the load surface A. The cell controller 47 stores the position at which the article P stops.

According to the first modification of the embodiment, with the controller 17 that moves the article P on the load surface A until the article P is detected by each of the first optical sensor 45*a* and the second optical sensor 45*b*, the article P can be easily and accurately moved to a desired position. Furthermore, with the first optical sensor 45*a* and the second optical sensor 45*b* that are provided at the first end portion and the second end portion, respectively, of the load surface A with respect to the second conveyance direction, the article P can be easily and accurately moved to both end portions of the load surface A with respect to the second conveyance direction.

In the above-described first modification, it is also possible that only one of the first optical sensor 45*a* and the second optical sensor 45*b* is provided. Although the first optical sensor 45*a* and the second optical sensor 45*b* are provided in the above-described first modification, the present invention is not limited to this, and pressure sensors that are attached to or incorporated in the cross belt 61 or the belt support board 64 may also be provided as an alternative or in addition to the optical sensors. Moreover, in the case where the temperature of the article P is higher or lower than that of the surrounding environment, thermal sensors may be provided as an alternative or in addition to the optical sensors.

Figure 11:
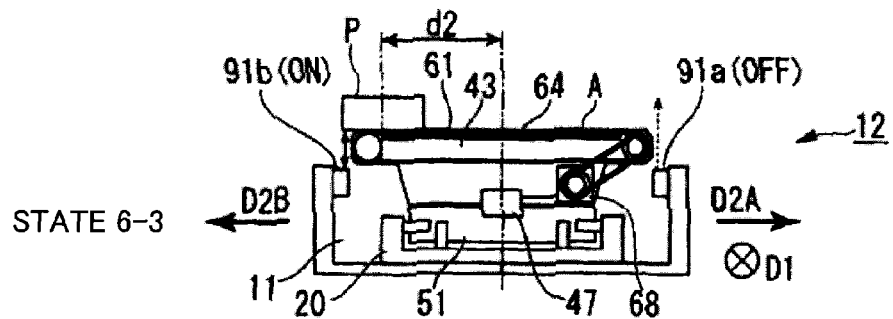
FIG. 11 shows side views illustrating State 6-3 and State 10-3 that are created by an example of the operation of an article sorting apparatus according to a second modification of the embodiment.
Figure 11:
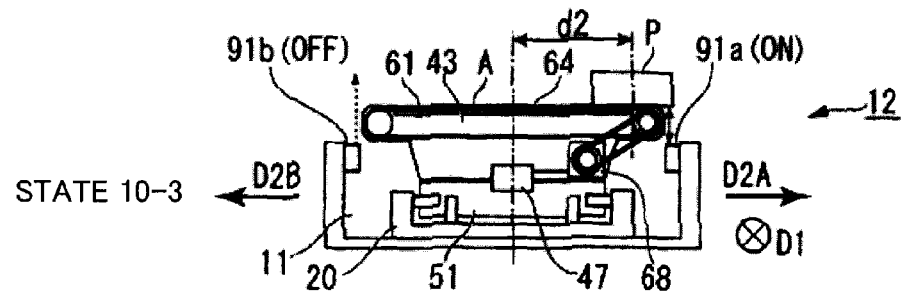

In the above-described first modification, the first optical sensor 45*a* and the second optical sensor 45*b* are provided in each conveyor cell 12; however, the present invention is not limited to this. In the article sorting apparatus 10 according to a second modification of the embodiment, as shown in FIG. 11, a first optical sensor 91*a* and a second optical sensor 91*b* may also be provided on the conveyance path 11. It should be noted that State 6-3 and State 10-3 shown in FIG. 11 correspond to State 6 shown in FIG. 7 and State 9 shown in FIG. 9 that are described above. The first optical sensor 91*a* is disposed on the conveyance path 11 on an outward side of the first end portion of the load surface A with respect to the second conveyance direction. The second optical sensor 91*b* is disposed on the conveyance path 11 on an outward side of the second end portion of the load surface A with respect to the second conveyance direction. The first optical sensor 91*a* and the second optical sensor 91*b* may be, for example, optical sensors of a transmission type, a reflection type, a proximity type, or the like. The first optical sensor 91*a* and the second optical sensor 91*b* detect whether any portion of the article P protrudes beyond the load surface A.

For example, the first optical sensor 91*a* has its optical axis extending upward in the vertical direction at a position on the outward side of the first end portion of the load surface A with respect to the first transfer direction D2A. For example, the second optical sensor 91*b* has its optical axis extending upward in the vertical direction at a position on the outward side of the second end portion of the load surface A with respect to the second transfer direction D2B. The first optical sensor 91*a* and the second optical sensor 91*b* are operated by power that is fed from the conveyance path 11.

Each of the first optical sensor 91*a* and the second optical sensor 91*b* includes, if the optical sensors are optical sensors of a reflection type, for example, a light emitting portion and a light receiving portion that are disposed facing upward in the vertical direction. Irradiation light that is output upward in the vertical direction from the light emitting portion is reflected by an article P if that article P is present on the optical axis, and then received by the light receiving portion. Each of the first optical sensor 91*a* and the second optical sensor 91*b* outputs an ON signal if an article P is present on the optical axis of the irradiation light that is output from the light emitting portion, and thus the light receiving portion continues receiving reflection light that is obtained by the irradiation light being reflected by the article P. Each of the first optical sensor 91*a* and the second optical sensor 91*b* outputs an OFF signal if no article P is present on the optical axis of the irradiation light that is output from the light emitting portion, and thus receipt of the reflection light by the light receiving portion is interrupted.

When moving the position of the article P on the load surface A to a position that is offset from the middle position in the second conveyance direction, the cell controller 47 controls driving of the cross belt 61 in accordance with the ON/OFF signal output from each of the first optical sensor 91*a* and the second optical sensor 91*b*. For example, the cell controller 47 uses the ON/OFF signal from each of the first optical sensor 91*a* and the second optical sensor 91*b* when moving the article P on the load surface A as appropriate for each curve of the conveyance path 11 and the chute 81 corresponding to the classification destination of the article P.

For example, the cell controller 47 drives the cross belt 61 in the first transfer direction D2A until the output of the first optical sensor 91a changes from the OFF signal to the ON signal. If the output of the first optical sensor 91a changes from the OFF signal to the ON signal, the cell controller 47 judges that a portion of the article P has reached a position at which it protrudes outward from the first end portion on the load surface A, and stops driving of the cross belt 61. For example, the cell controller 47 drives the cross belt 61 in the second transfer direction D2B until the output of the second optical sensor 91b changes from the OFF signal to the ON signal. If the output of the second optical sensor 91b changes from the OFF signal to the ON signal, the cell controller 47 judges that the article P has reached a position at which it protrudes outward from the second end portion on the load surface A, and stops driving of the cross belt 61.

Since the first optical sensor 91a and the second optical sensor 91b detect the portion of the article P that protrudes outward from the load surface A with respect to the second conveyance direction, the center position of the article P on the load surface A is the position that is offset from the middle position of the load surface A by a predetermined distance d2 (>d1) that is larger than the predetermined distance d1. According to the second modification, each conveyor cell 12 is not required to have the first optical sensor 45a and the second optical sensor 45b and thus can convey an article that is larger than the load surface A with respect to the first conveyance direction D1 (i.e., article that protrudes from the load surface A in the first conveyance direction D1).

In the above-described second modification, it is also possible that only one of the first optical sensor 91a and the second optical sensor 91b is provided. In the above-described second modification, it is also possible that the article sorting apparatus 10 includes a plurality of pairs of first and second optical sensors 91a and 91b that are continuously or discontinuously arranged along the entire length of the conveyance path 11. Moreover, it is also possible that the article sorting apparatus 10 includes at least one pair of first and second optical sensors 91a and 91b that is disposed in a portion of the conveyance path 11. The article sorting apparatus 10 may also include a first optical sensor 91a and a second optical sensor 91b at least at a location on the conveyance path 11 where the controller 17 sets the position of the article P on the load surface A. The article sorting apparatus 10 may also include a first optical sensor 91a and a second optical sensor 91b around each of the loading portion 13, the first sorting portion 15 and the second sorting portion 16, as well as the first curve 21 and the second curve 22, for example.

In the above-described embodiment, each conveyor cell 12 may also include a rotation sensor that detects the angle of rotation of the motor 68. In this case, the cell controller 47 may calculate the position of the article P on the load surface A in the second conveyance direction based on the angle of rotation of the motor 68 that is detected by the rotation sensor. The cell controller 47 may calculate the distance for which the article P needs to be moved in order to move the article P from the calculated position of the article P to the predetermined position in the second conveyance direction (i.e., position that is offset from the middle position on the load surface A in the second conveyance direction), and move the article P for the calculated distance.

Although a high-speed camera is used as the article position acquisition portion 14 in the above-described embodiment, the present invention is not limited to this. For example, another camera or a position sensor such as a line sensor may also be used as the article position acquisition portion 14.

Although the conveyance path 11 having the configuration shown in FIG. 1 is used in the above-described embodiment, the present invention is not limited to this. In a modification of the embodiment, for example, the conveyance path 11 may have each of the loading portion 13, the article position acquisition portion 14, and the sorting portions at one location or a plurality of locations. For example, with respect to the conveyance path 11, the number of curves, the direction of each curve, and the shape of each curve may be set as desired, and an upward slope or a downward slope may also be provided if necessary.

Although the conveyance path 11 includes the first curve 21, the second curve 22, the third curve 23, and the fourth curve 24 in the above-described embodiment, the present invention is not limited to this, and the number of curves provided in the conveyance path 11 and the shape of each curve may be changed appropriately. Moreover, although the article sorting apparatus 10 in the foregoing description includes the loading portion 13, the article position acquisition portion 14, the first sorting portion 15, and the second sorting portion 16 that are arranged along the conveyance path 11, the present invention is not limited to this, and the numbers of loading portions, information acquisition portions, and sorting portions may be changed appropriately. For example, a second loading portion may also be added between the first sorting portion 15 and the second sorting portion 16. In this case, the processing speed of the article sorting apparatus 10 may be improved by adopting a configuration in which immediately after a conveyor cell 12 is emptied by loading the article P thereon into the chute 81 in the first sorting portion 15, an article P is loaded onto that conveyor cell 12 from the second loading portion.

Although the conveyance path 11 and the plurality of conveyor cells 12 include the linear synchronous motor 31 in the above-described embodiment, the present invention is not limited to this, and it is also possible that a linear induction motor is included. Moreover, it is also possible that each conveyor cell 12 includes a driving wheel and a motor that drives and rotates the driving wheel, instead of the linear synchronous motor 31, and travels along the conveyance path 11 using the motor as a traveling driving source. Moreover, it is also possible that each conveyor cell 12 is conveyed along the conveyance path 11 by a transmission mechanism that mechanically transmits the driving force, instead of the linear synchronous motor 31. For example, a configuration may be adopted in which a flat plate is provided extending downward in the vertical direction from the chassis 51 of the chassis portion 41, an end portion of the flat plate is sandwiched between a pair of rollers that are driven and rotated by a motor and that are located on opposite sides of the end portion with respect to the thickness direction thereof, and thus the driving force in the first conveyance direction D1 is obtained.

Although the noncontact feeding portion 34 is provided along the entire length of the conveyance path 11 in the above-described embodiment, the present invention is not limited to this, and it is also possible that the noncontact feeding portion 34 is provided in a portion of the conveyance path 11. The noncontact feeding portion 34 may be provided at least around each of the loading portion 13, the first sorting portion 15 and the second sorting portion 16, as well as the first curve 21 and the second curve 22 (e.g., around the exit of each of the first curve 21 and the second curve 22, etc.). In the above-described embodiment, it is also possible that adjacent conveyor cells 12 are connected to each other by a cable through which power that is fed from the noncontact feeding portion 34 or control signals are transmitted. In the above-described embodiment, it is also possible that each conveyor cell 12 includes, with respect to the power that is fed from the noncontact feeding portion 34, an AC/DC converter that converts the power to direct current, a transformer that increases or reduces the voltage, a rectifying accumulator, and a capacitor, a battery, and the like for accumulating electricity.

In the above-described embodiment, the noncontact feeding portion 34 feeds power from the conveyance path 11 to each conveyor cell 12 in a contactless manner by electromagnetic induction; however, the present invention is not limited to this. For example, the noncontact feeding portion 34 may also feed power from the conveyance path 11 to each conveyor cell 12 in a contactless manner by radio transmission and reception, magnetic field resonance, electric field coupling, or the like.

In the above-described embodiment, conveyor cells 12 that are adjacent to each other on the front side and the rear side in the first conveyance direction D1 are coupled to each other by their respective connection mechanisms 53; however, the present invention is not limited to this, and the plurality of conveyor cells 12 may be separate from and independent of each other.

In the above-described embodiment, a servo motor is used as the motor 68; however, the present invention is not limited to this, and, for example, a DC motor, a brushless DC motor, a stepping motor, or the like may also be used as the motor 68.

In the above-described embodiment, the cross belt mechanism 42 may also include a tension adjustment mechanism that adjusts the tension of the cross belt 61 by adjusting the distance between the driving roller 62 and the driven roller 63. Moreover, the cross belt mechanism 42 may also include a tension roller that adjusts the tension of the cross belt 61, in addition to the driving roller 62 and the driven roller 63.

In the above-described embodiment, each chute 81 in the first sorting portion 15 and the second sorting portion 16 may also include a conveyance portion such as a belt conveyor that is operable to draw in the article P released from the cross belt 61 of each conveyor cell 12.

In the above-described embodiment, the article position acquisition portion 14 includes the information acquisition portion 14a that is configured integrally therewith; however, the present invention is not limited to this. In a modification of the embodiment, the information acquisition portion may be provided independently of the article position acquisition portion 14. For example, the information acquisition portion may be disposed in the loading portion 13, between the loading portion 13 and the first sorting portion 15 on the conveyance path 11, upstream of the article sorting apparatus 10 on a conveyance route of the article P, or the like.

It should be noted that in the above-described embodiment, before entry of a conveyance unit into a curve, if the curvature radius of the curve is less than a predetermined threshold value, the position of the article on the load surface of the conveyance unit is moved from the loading position or the placement position on the conveyance unit to a position that is offset from the middle position on the load surface to the inward side with respect to the radial direction of the curve; however, the following control may also be performed. That is to say, during loading of an article from the loading portion to a conveyance unit, since the curvature radius of the next curve is known, if that curvature radius is less than the predetermined threshold value, the loading position to which the article is loaded from the loading portion is adjusted to a position that is offset from the middle position on the load surface of the conveyance unit to the inward side with respect to the radial direction of that curve. In this manner, the necessity to move the article immediately before the conveyance unit enters the curve is eliminated. As a result, it is not necessary to provide the noncontact feeding portion that feeds power from the conveyance path to the conveyance unit in a contactless manner immediately before the curve.

According to the at least one embodiment described above, with the controller 17 that sets the position of the article P on the load surface A in accordance with the curvature radius of each curve, each conveyor cell 12 can properly pass through curves of various shapes while changing the position of the article P on the load surface A. With the controller 17 that moves the position of the article P on the load surface A to a position that is offset from the middle position in the second conveyance direction in accordance with the curvature radius of each curve, the position of the article P can be made appropriate in accordance with the centrifugal force acting on the article P and the friction force between the article P and the load surface A. With the controller 17 that makes the position of the article P on the load surface A appropriate for curves of various shapes, the necessity to increase the curvature radius of each curve is eliminated, so that the size of the article sorting apparatus 10 can be reduced, and also the processing speed of the article sorting apparatus 10 can be increased.

Furthermore, with the controller 17 that, if the curvature radius of a curve is less than the first threshold value, moves the position of the article P on the load surface A to a position that is offset from the middle position to the inward side with respect to the radial direction of the curve, the centrifugal force of the article P can be significantly reduced by increasing the radius of gyration of the article P. With the controller 17 that, if the curvature radius of a curve is less than the first threshold value, reduces the centrifugal force acting on the article P, the centrifugal force of the article P can be prevented from becoming larger than the friction force between the article P and the load surface A, so that the article P can be prevented from starting to slide on the load surface A. Thus, the working efficiency of the article sorting apparatus 10 can be improved, and also the overall throughput of a distribution system can be improved.

Furthermore, with the controller 17 that moves the position of the article P on the load surface A of each conveyor cell 12 to a position that is offset to a side closer to the chute 81 corresponding to the classification destination of the article P, the working efficiency of the article sorting apparatus 10 can be improved. Furthermore, the time that is taken to load the article P into the chute 81 can be reduced, and the load on the motor 68 during loading of the article P into the chute 81 can be reduced.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An article sorting apparatus, comprising:
a conveyance path extending in a first conveyance direction, the conveyance path having a curve;
a conveyance unit that moves along the conveyance path and conveys an article loaded on the conveyance unit in a second conveyance direction that intersects the first conveyance direction of the conveyance path;
a loading portion that loads the article onto the conveyance unit;
a sorting portion that sorts the article conveyed by the conveyance unit; and
a controller that controls movement of the conveyance unit in the first conveyance direction and conveyance of the article in the second conveyance direction and controls the conveyance unit before entry of the conveyance unit into the curve such that if the curve has a curvature radius that is less than a predetermined threshold value, the position of the article on a load surface of the conveyance unit on which the article is placed is adjusted to a position that is offset from a middle position on the load surface to an inward side with respect to a radial direction of the curve.

2. The apparatus according to claim 1, wherein the controller controls the conveyance unit such that if the curve has a curvature radius that is not less than the predetermined threshold value, and a sorting destination of the article in the sorting portion is located downstream of the curve in the first conveyance direction, the position of the article on the load surface is adjusted to a position that is offset from the middle position on the load surface to a side closer to the sorting destination.

3. The apparatus according to claim 2, wherein the controller controls the conveyance unit such that if the curve that is located immediately before the sorting destination in the first conveyance direction has a curvature radius that is less than the predetermined threshold value, the position of the article on the load surface is adjusted to a position that is offset from the middle position on the load surface to the inward side with respect to the radial direction of the curve.

4. The apparatus according to claim 1, wherein the controller sets the predetermined threshold value in accordance with a length of the load surface in the second conveyance direction and the curvature radius of the curve.

5. The apparatus according to claim 1, wherein the controller sets the position that is offset from the middle position on the load surface in the second conveyance direction to be a position at which an end portion of the article coincides with at least one of a first end portion and a second end portion of the load surface with respect to the second conveyance direction.

6. The apparatus according to claim 1, further comprising:
a position sensor that detects the position of the article on the load surface,
wherein, based on the position of the article that is detected by the position sensor, the controller acquires a distance for which the article needs to be moved in order to move the article to the position that is offset from the middle position on the load surface in the second conveyance direction and moves the article for the acquired distance.

7. The apparatus according to claim 1, further comprising:
a sensor that is disposed at a position offset from the middle position in the second conveyance direction and that detects whether the article is present,
wherein the controller moves the article until the article is detected by the sensor.

8. The apparatus according to claim 7, wherein the sensor is disposed in the conveyance unit and detects whether the article is present on at least one of the first end portion and the second end portion of the load surface with respect to the second conveyance direction.

9. The apparatus according to claim 7, wherein the sensor is disposed on the conveyance path and detects whether the article is present at a position on an outward side of the load surface with respect to the second conveyance direction beyond at least one of the first end portion and the second end portion of the load surface with respect to the second conveyance direction.

10. The apparatus according to claim 9, wherein a plurality of said sensors are arranged continuously or discontinuously along the entire length of the conveyance path.

11. The apparatus according to claim 1, further comprising:
a noncontact feeding portion that is disposed at least around the loading portion, around the sorting portion, and upstream of the curve and that feeds power from the conveyance path to the conveyance unit in a contactless manner.

12. An article sorting apparatus, comprising:
a conveyance path extending in a first conveyance direction, the conveyance path having a curve;
a conveyance unit that moves along the conveyance path and conveys an article loaded on the conveyance unit in a second conveyance direction that intersects the first conveyance direction of the conveyance path;
a loading portion that loads the article onto the conveyance unit;
a sorting portion that sorts the article conveyed by the conveyance unit; and
a controller that controls movement of the conveyance unit in the first conveyance direction and conveyance of the article in the second conveyance direction and controls the conveyance unit such that if the curve that is located downstream of the loading portion in the first conveyance direction has a curvature radius that is less than a predetermined threshold value, the position of the article that is loaded onto the conveyance unit from the loading portion is a position that is offset from a middle position on a load surface to an inward side with respect to a radial direction of the curve.

* * * * *